United States Patent
Diaz et al.

(10) Patent No.: US 10,754,545 B2
(45) Date of Patent: Aug. 25, 2020

(54) DISPLAY DEVICE WITH AN AUXILIARY SEGMENT FOR A SEAT DEVICE OF A TRANSPORTATION VEHICLE AND ASSOCIATED METHODS THEREOF

(71) Applicant: Panasonic Avionics Corporation, Lake Forest, CA (US)

(72) Inventors: David E. Diaz, Rancho Santa Margarita, CA (US); Steven Vazquez, Alta Loma, CA (US); Andrew Barnes, Mission Viejo, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 16/141,085

(22) Filed: Sep. 25, 2018

(65) Prior Publication Data

US 2020/0097169 A1    Mar. 26, 2020

(51) Int. Cl.

| | |
|---|---|
| *G06F 3/0488* | (2013.01) |
| *G06F 3/044* | (2006.01) |
| *G06F 3/0481* | (2013.01) |
| *G06F 3/041* | (2006.01) |
| *G09G 3/36* | (2006.01) |
| *B64D 11/00* | (2006.01) |
| *B60R 16/037* | (2006.01) |
| *H04L 29/08* | (2006.01) |

(52) U.S. Cl.
CPC ........ *G06F 3/04886* (2013.01); *B60R 16/037* (2013.01); *B64D 11/00151* (2014.12); *G06F 3/044* (2013.01); *G06F 3/0416* (2013.01); *G06F 3/04817* (2013.01); *G09G 3/36* (2013.01); *G06F 2203/04803* (2013.01); *G09G 2354/00* (2013.01); *G09G 2380/10* (2013.01); *G09G 2380/12* (2013.01); *H04L 67/12* (2013.01)

(58) Field of Classification Search
CPC .... G06F 3/04886; G06F 3/0416; G06F 3/044; G06F 3/04817; B64D 11/00151; B64D 11/00155; B60R 16/037; G09G 3/36
See application file for complete search history.

(56) References Cited

U.S. PATENT DOCUMENTS

| | | | |
|---|---|---|---|
| 7,748,634 B1 | 7/2010 | Zehr et al. | |
| 9,079,498 B2 * | 7/2015 | Small | B60K 35/00 |
| D753,077 S | 4/2016 | Margis et al. | |
| D773,423 S | 12/2016 | Margis et al. | |

(Continued)

OTHER PUBLICATIONS

Design U.S. Appl. No. 29/634,262, filed Jan. 19, 2018, 35 pages.

*Primary Examiner* — Sardis F Azongha
(74) *Attorney, Agent, or Firm* — Klein, O'Neill & Singh, LLP

(57) ABSTRACT

Methods and systems for a transportation vehicle are provided. A seat device of the vehicle includes a processor executing instructions out of a memory and a display device for displaying content of a media file of an entertainment system. The display device includes a first segment to display content of the media file, and a second segment with a capacitive layer. The second layer includes an auxiliary control segment with input icons to control media file presentation without displaying any control icons within the first segment while the content is being played, and/or an auxiliary display segment separate from the first segment to display messages without interrupting media file presentation.

20 Claims, 11 Drawing Sheets

(56) References Cited

U.S. PATENT DOCUMENTS

| | | | |
|---|---|---|---|
| 9,648,279 B2* | 5/2017 | Shen | H04N 19/136 |
| 9,878,618 B2* | 1/2018 | Kotter | G06F 3/0488 |
| D812,026 S | 3/2018 | Margis et al. | |
| D819,582 S | 6/2018 | Izadyar et al. | |
| 2008/0225014 A1* | 9/2008 | Kim | G06F 3/04883 |
| | | | 345/173 |
| 2011/0141057 A1* | 6/2011 | Sizelove | B60N 3/004 |
| | | | 345/174 |
| 2011/0174926 A1* | 7/2011 | Margis | B60N 3/004 |
| | | | 244/118.6 |
| 2015/0254041 A1* | 9/2015 | Hoshihara | B60K 37/06 |
| | | | 345/173 |
| 2016/0077652 A1* | 3/2016 | Yang | G06F 3/04886 |
| | | | 345/174 |
| 2016/0191837 A1* | 6/2016 | Huh | H04N 5/4403 |
| | | | 348/564 |
| 2016/0378234 A1 | 12/2016 | Ligtenberg et al. | |
| 2017/0052628 A1* | 2/2017 | Yi | G06F 1/1626 |
| 2018/0307356 A1* | 10/2018 | Zhu | G06F 3/167 |
| 2019/0020923 A1* | 1/2019 | Joye | H04N 21/42201 |

* cited by examiner

DISPLAY DEVICE WITH AN AUXILIARY SEGMENT FOR A SEAT DEVICE OF A TRANSPORTATION VEHICLE AND ASSOCIATED METHODS THEREOF

TECHNICAL FIELD

The present disclosure relates to seat devices on a transportation vehicle system, and in particular to providing an auxiliary display area using a capacitive layer.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today may have individualized functional equipment dedicated to a particular passenger seat, which can be utilized by the passenger, such as adjustable seats, adjustable environmental controls, adjustable lighting, telephony systems, video and/or audio entertainment systems, crew communication systems, and the like. Many commercial airplanes today may also have individualized video and audio entertainment systems, often referred to as "inflight entertainment" or "IFE" systems. Such systems may also be referred to as "inflight entertainment and communication" systems as well, and typically abbreviated as "IFEC" systems.

As one example of a function that a passenger may activate, entertainment systems for passenger carrier vehicles, such as commercial airlines, often have video displays installed at each passenger seat. For instance, video displays may be provided at each passenger seat, such as mounted at each of the seats of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), Internet browsing, and other computer applications. Sometimes such displays are referred to as smart monitors due to the ability to provide computer applications and process and store data internally.

Conventional smart monitors today provide media control options on a smart monitor. The control buttons are accessed by a user, however, the media that is being played when the user accesses the controls may be interrupted. This is undesirable because it negatively interferes with the user's viewing experience. Furthermore, in conventional smart monitors, hard-coded capacitive buttons are used for receiving user inputs. This is undesirable because different vehicle operators may have different needs and hardcoded buttons are difficult to change. Therefore, technology is being developed to customize capacitive input buttons and provide auxiliary display areas from where users can control media display without interruption.

SUMMARY

In one aspect, a system for an aircraft is disclosed. The system includes an in-flight entertainment system with an information processing system including a seat device. The seat device includes a processor and a memory with the processor executing instructions out of the memory and a display device for displaying content from a media file.

The display device includes a display area to display the content of the media file; and a capacitive layer. The capacitive layer includes an auxiliary display. The auxiliary display includes at least of an auxiliary control segment with input icons to control media file presentation without displaying any control function icons within the display area, while the content is being played, and an auxiliary display segment separate from the display area to display messages without interrupting media file presentation.

In another aspect, a seat device of a transportation vehicle is disclosed. The seat device includes a processor and a memory with the processor executing instructions out the memory and a display device for displaying content of a media file. The display device includes a first segment to display content of the media file, and a second segment with a capacitive layer. The second segment including at least one of an auxiliary control segment with input icons to control media file presentation without displaying any control icons within the first segment while the content is being played, and an auxiliary display segment separate from the first segment to display messages without interrupting media file presentation. Control icons dynamically change within the auxiliary control segment based on media type or functional context.

In yet another aspect, a method is disclosed. The method includes mounting a seat device in a vehicle for use by a passenger at a seat. The seat device includes a processor executing instructions out of a memory and a display device for displaying content from a media file in which the display device includes a display area where the content is displayed.

The method also includes providing an auxiliary control segment with input icons to control media file presentation proximate the display area while the content is being played in which the auxiliary segment is separate from the display area, changing input icons based on the content displayed in the display area or the context, and receiving and displaying messages on the auxiliary segment.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
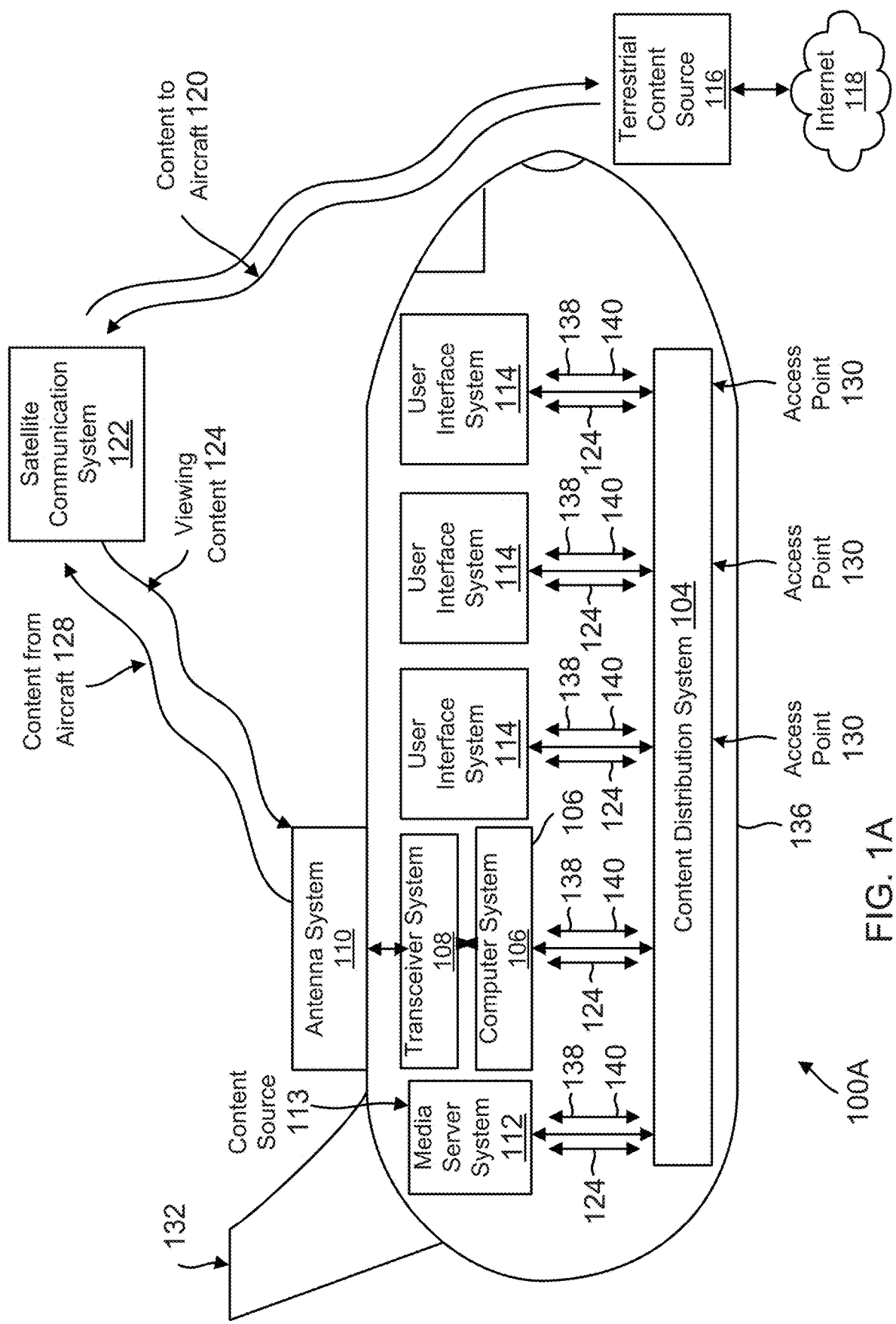
FIG. 1A shows an example of an operating environment for implementing the various aspects of the present disclosure on an aircraft.

Vehicle Information System:

FIG. 1A shows an example of a generic vehicle information system 100A (also referred to as system 100A) that can be configured for installation aboard an aircraft 132 for using the innovative technology described herein, according to one aspect of the present disclosure. When installed on an aircraft, system 100A can comprise an aircraft passenger IFE system, such as the Series 2000, 3000, eFX, eX2, eX3, eXW, NEXT, and/or any other inflight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system.

The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content 124 as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the content 120, as processed by the transceiver system 108, to a computer system 106 of system 100A. The computer system 106 can provide the received content 120 to the media (or content) server system 112 and/or directly to one or more of the user interfaces 114 as viewing content 124. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. In one aspect, the user interface system 114 includes a hardware interface to connect to an access point 130 that provides a wired and/or a wireless connection for the user interface system.

In one aspect, the user interface system 114 comprises a processor executable application that a user downloads and installs to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 may also include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, a Wi-Fi connection or for any other reason, payment information likewise can be entered via the input system. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements and the adaptive aspects described herein are not limited to any specific seat arrangements or user interface types.

Figure 1B:
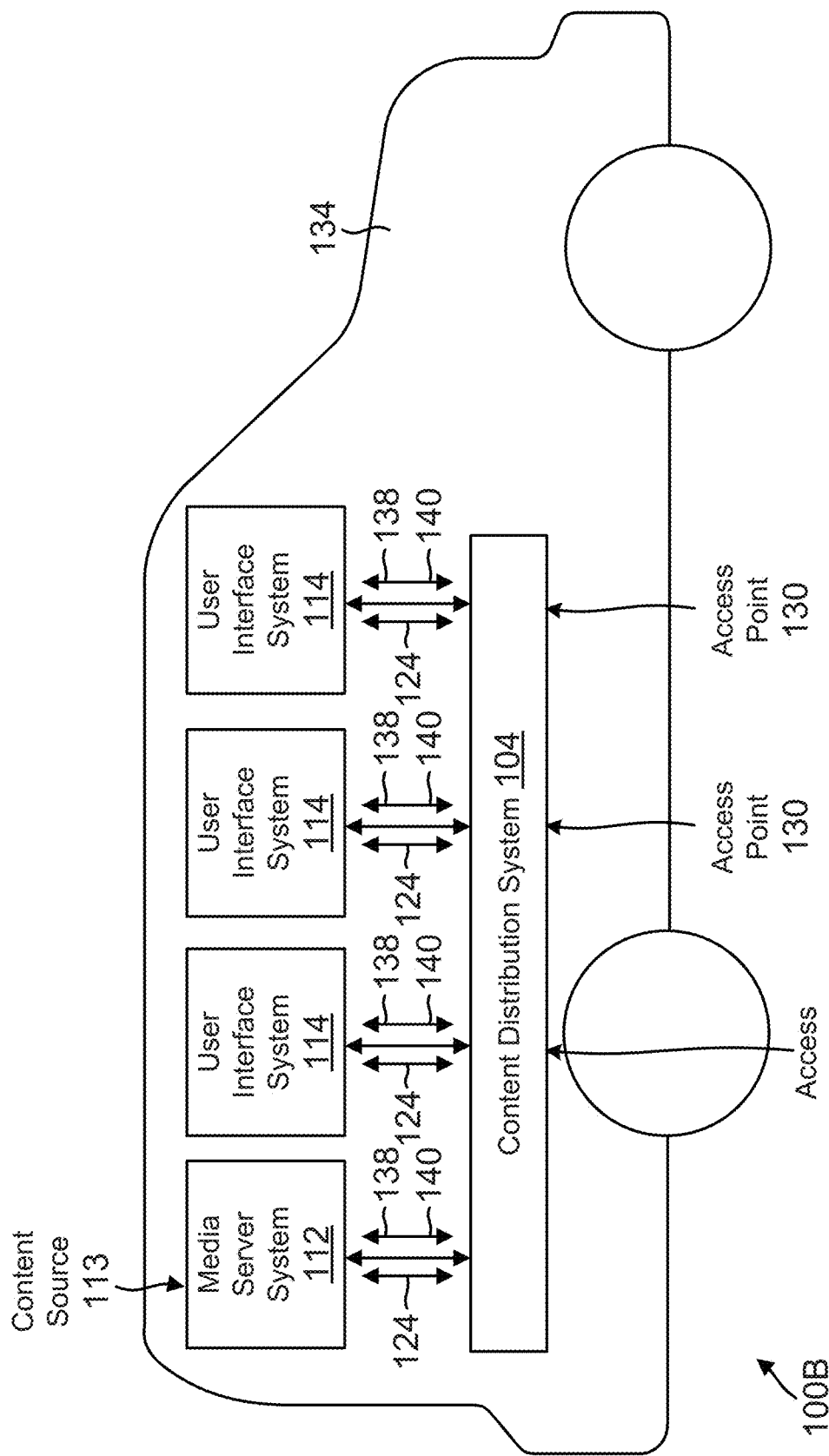
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
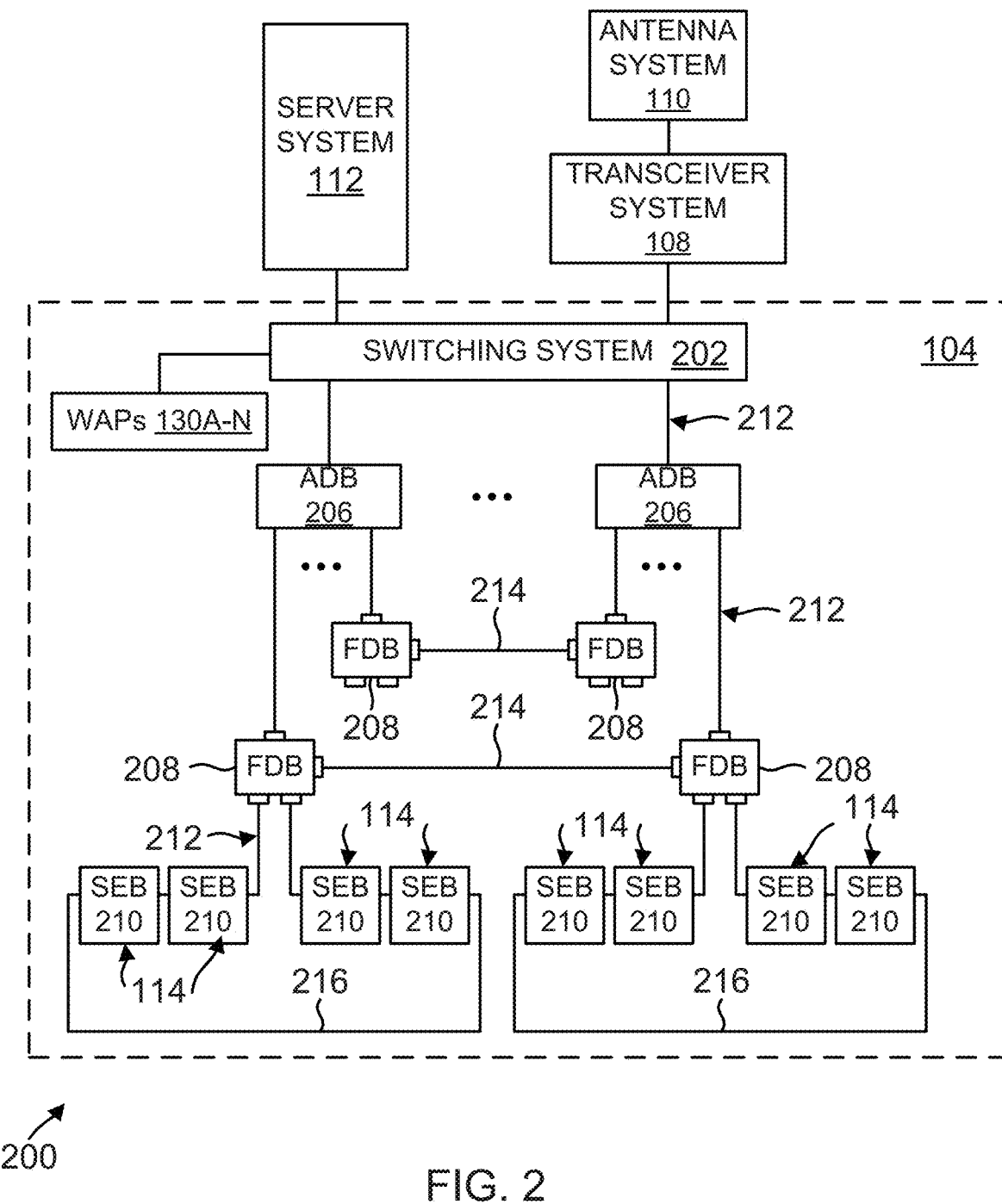
FIG. 2 shows an example of a content distribution system on an aircraft, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
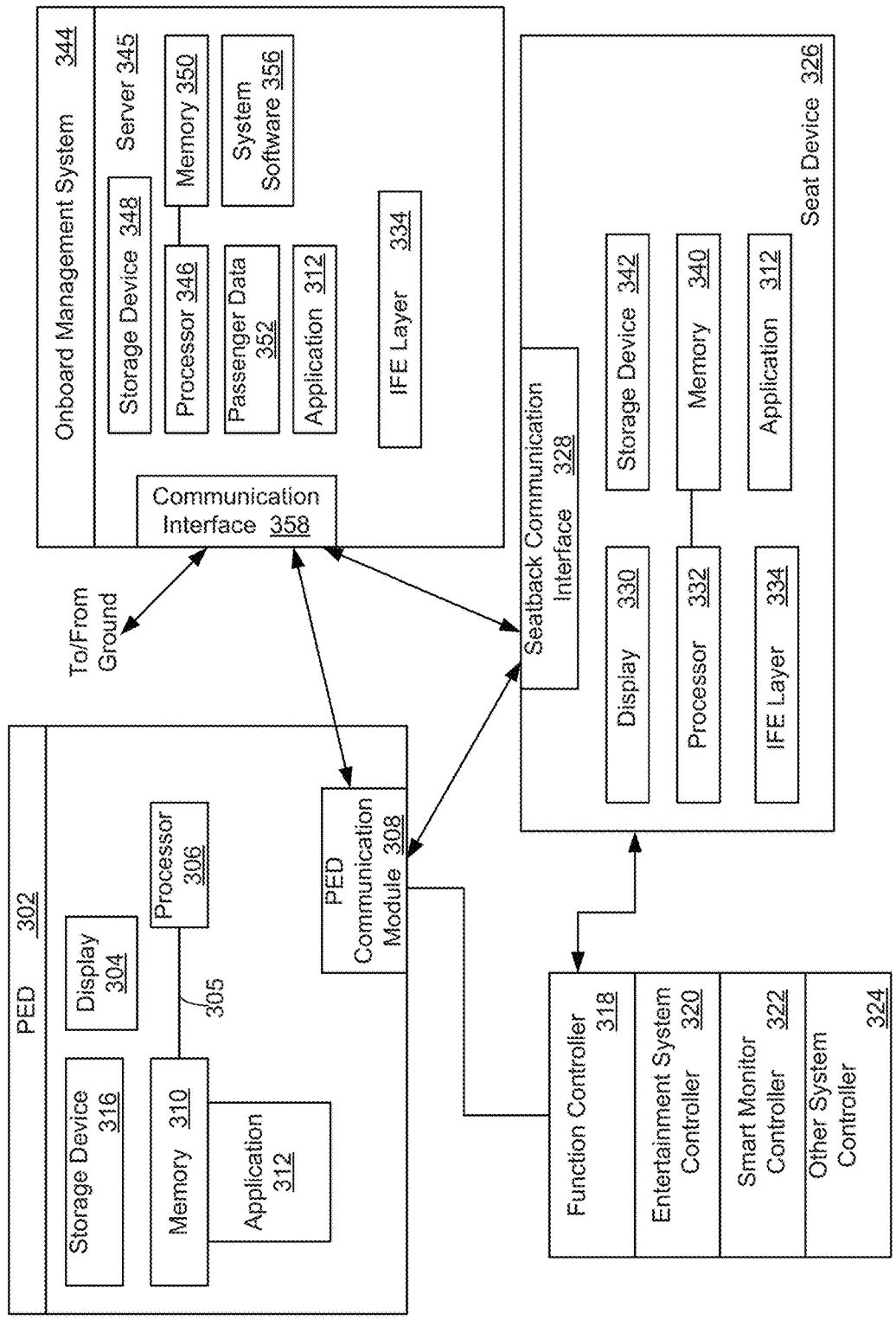
FIG. 3A shows an example of a seat device interfacing with other systems of a transportation vehicle, according to one aspect of the present disclosure.

System 300:

FIG. 3A shows an example of a system 300 using the innovative computing/display technology, according to one aspect of the present disclosure. System 300 includes a PED 302, an onboard management system 344, a function controller 318 and a seat device 326 (may also be referred to as seatback device or a smart monitor). The onboard management system 344 may be similar to computer system 106 and/or server 112 described above with respect to FIGS. 1A/1B. The seat device 326 may be part of the user interface system 114 or interfaces with the user interface system 114 described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific type, location or orientation of the seat device 326.

In one aspect, the function controller 318 provides a controller 320 to control the entertainment system for accessing audio/video content, and a controller 322 for controlling a display of seat device 326. In another aspect, the seat device 326 includes an auxiliary control segment 362 for controlling various seat functions, as described below in detail. The auxiliary control segment 362 may be provided in addition to or in lieu of the function controller 320.

Other system controller 324 may include a controller for controlling the lighting system for controlling lights for a passenger seat, e.g., a reading light, a controller for an attendant call system to call an attendant, a controller for a telephone system, a controller for food service to order food, a controller for making seat adjustments and others. The various aspects disclosed herein are not limited to any particular type of function.

In one aspect, the seat device 326 includes a display device or simply "display" 330, a processor 332, a memory 340, a communication interface 328 and a local storage device 342 for storing content. The seat device 326 receives user input/requests via an auxiliary control segment 362 described below with respect to FIG. 3B. The auxiliary control segment 362 is a customized capacitive layer that may be configured to operate as a local touch screen across the display 330, as described below in detail.

Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In one aspect, processor 336 executes an IFE layer (may also be referred to as IFE controller) 334 that provides inflight entertainment and other options to users. The IFE layer 334 uses the communication interface 328 to interface with the PED 302 and/or onboard management system 344. The IFE layer 334 provides audio/video content as well as controls for accessing the content.

In one aspect, the onboard management system 344 includes a server 345 (similar to media server 112 and/or computer system 106). The server 345 includes a processor 346 that has access to a memory 350 via a bus system, similar to bus 305 described below in detail.

Processor 346 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data, applications, structured or unstructured data and program files including an application 312, system software 356, and/or the IFE layer 334.

In one aspect, the onboard management system 344 maintains passenger data 352 that identifies each passenger for a flight, a seat assigned to a passenger and any other information that can uniquely identify the passenger. The passenger data 352 may be populated from an electronic boarding pass that is used by a passenger and/or from the carrier operating the aircraft. The information from passenger data 352 may be provided to seat device 326 for validating passenger information to pair PED 302.

System software 356 of the onboard management system 344 is executed by the processor 346 to control the overall operation of the server 345.

In one aspect, server 345 communicates with PED 302 and/or seat device 326 via a communication interface 358. The communication interface 358 may also be used to receive information from the ground. The communication interface 358 includes one or more interfaces for a wired and/or wireless connection, as described above with respect to FIGS. 1A/1B and 2.

The PED 302 may also be used with the onboard management system 344 for activating a function or requesting a service, in one aspect of the present disclosure. The PED 302 may be optionally paired or associated with the seat device 326.

In one aspect, the PED 302 may be a mobile phone, a notebook, a tablet, a laptop or any other similar device. PED 302 may include a processor 306 that has access to a memory 310 via an interconnect/bus 305 for executing stored instructions. Processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 305 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

PED 302 includes a storage device 316 that may be, or may include any storage medium for storing data in a non-volatile manner, such as one or more magnetic or optical based disks, flash memory, or solid-state drive. The storage device 316 may store content that is displayed on a display 304 of PED 302 and other information. In one aspect, display 304 may also include a touch screen for receiving input commands.

The storage device 316 may further store pairing data that includes pairing information for securely pairing the PED 302 with the seat device 326 or any other aircraft system. The term "pair", and other grammatical forms such as "pairing", means that the PED 302 is associated with a particular passenger seat such that communications received by seat device 326 from the PED 302 are recognized as being related to that passenger seat and/or such communications control functions associated with the particular passenger seat and controlled by the function controller 318. The term automatic as associated with pairing means that the PED is paired with minimal passenger involvement. In one aspect, the pairing data includes PED 302 identification information, and/or configuration information that is used to pair the PED 302 including a seat identifier.

The storage device 316 may also store the application 312 and executed out of memory 310. In one aspect, application 312 enables the PED 302 to automatically pair with a transportation vehicle system in general and to the seat device 326 in particular, with minimal passenger involvement. In one aspect, application 312 may be stored on a storage device of an application store ("App Store") (not shown) such as that operated by Apple, Inc. under the trademark ITUNES, the application store operated by Google, Inc. under the trademark GOOGLE PLAY, or the application store operated by Microsoft Corporation under the trademark WINDOWS STORE, without derogation of any third party trademark rights. Alternatively, the app store may be a website server for a website operated by a provider of the on-board management system 344 such as the manufacturer or a carrier operating the vehicle (e.g., a commercial airline, train operator, cruise line, bus line, etc.).

It is noteworthy that application 312 may be executed in a distributed environment, for example, partly by seat device 326 and/or the onboard management system 344. The adaptive aspects described herein are not limited to any specific location for executing application 312.

In one aspect, the function controller 318 communicates with a PED communication module 308 that includes one or more interfaces to communicate with different devices, including a Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module 308 may have different interface, cards, logic and circuitry to comply with the different communication protocols/standards.

Figure 3B:
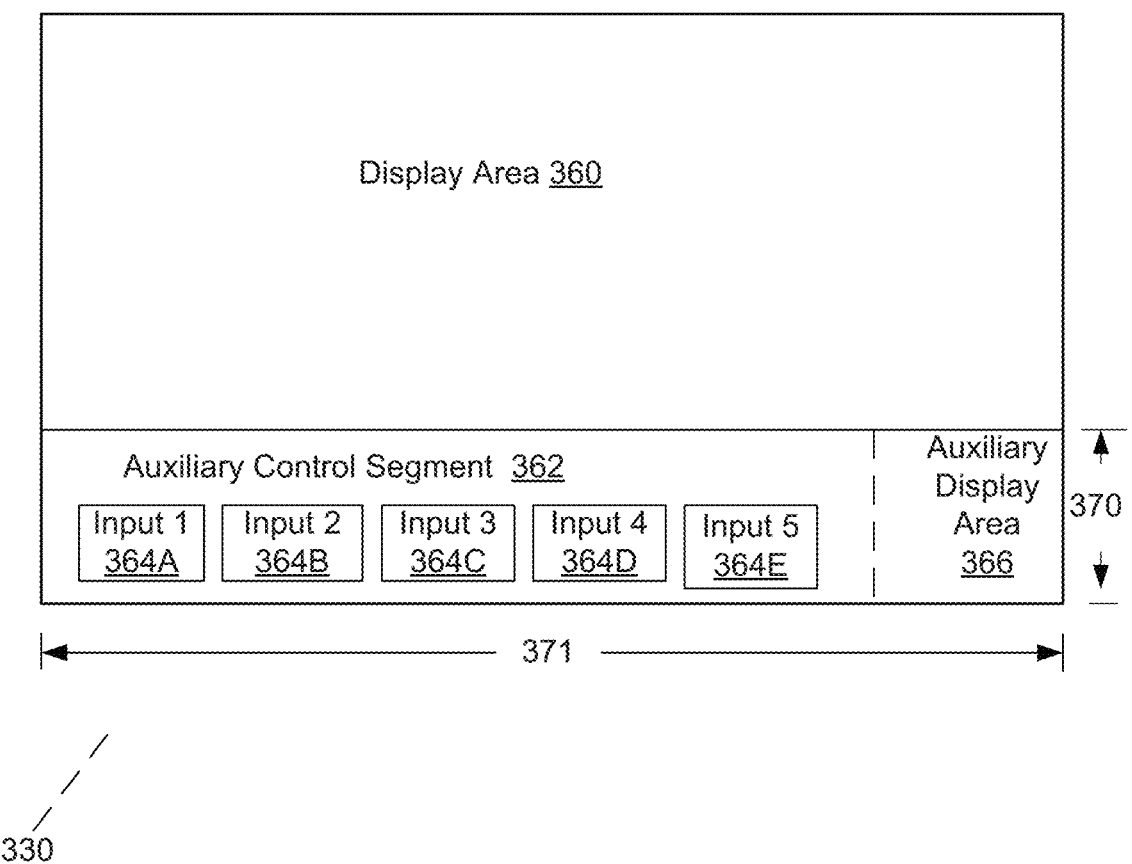
FIG. 3B shows an example of a display with an auxiliary control segment and an auxiliary display area, according to one aspect of the present disclosure.

FIG. 3B shows a block diagram of display 330 of seat device 326, according to one aspect of the present disclosure. Display 330 includes a display area 360 where media content is displayed to a passenger. The display area 360 may be a liquid crystal display (LCD) or any other display type.

In one aspect, seat device 326 includes an auxiliary control segment 362 (may be referred to as segment 362) and an auxiliary display area 366. Both the segment 362 and the auxiliary display area 366 are located across a capacitive layer 370. The auxiliary control segment 362 and auxiliary display area 366 together form an auxiliary segment 371 in which the auxiliary segment 371 and capacitive area layer 370 are coextensive with one another. Further, the auxiliary control segment 362 and auxiliary display area 366 each have a variable length controllable by the seat device 326. Depending on the situation, the seat device 362 may extend the auxiliary control segment 362 to encompass the entire length of the auxiliary segment 371, or none thereof, so that the segment 371 is entirely taken up by the auxiliary display area 366, or a combination thereof as illustrated in FIG. 3B (and also FIG. 3D).

In one aspect, the capacitive layer 370 may be oriented horizontally across the display area 360. In another aspect, the capacitive layer 370 may be oriented vertically next to the display area 360. The size of capacitive layer 370 (i.e. the height and width across display 330) will vary based on the overall size of display 330 and the orientation of the capacitive layer 370 with respect to the display area 360.

In one aspect, segment 362 includes a plurality of input icons, for example, 364A-364E. The input icons are customized based on airline preference. It is noteworthy that the five input icons are shown only as an example without limiting the present disclosure to any particular number of icons.

The input icons may be used to control media content and playback without interrupting display of the media. For example, the input icons may be used to play media, pause media play, and provide volume control. Since segment 362 is separate from display area 360, segment 362 icons do not appear within display area 360 and hence do not interfere with the user's viewing experience.

The auxiliary display area 362 may also be used to display messages to users without interrupting media shown on the display area 360. This allows a user to continue watching media while receiving certain specific, generic, public announcement, and/or other type messages in the auxiliary display area 362.

In one aspect, the auxiliary control segment 362 options change dynamically to provide supplemental control for the media that is displayed within display area 360.

For example, if a passenger is watching a movie on the main display area 360, the auxiliary control segment can display "Play/Pause" and "Volume Up/Down" buttons and a slider for "Fast Forward/Rewind." If a passenger is listening to music while playing a video game, the auxiliary control segment can display the name of the song being played and also provide the Volume Up/Down buttons and Fast Forward/Rewind slider so that the passenger can control the music without disturbing or interrupting the game being displayed. If a passenger is viewing trip information, the auxiliary control segment can display departure information for the passenger's next flight and/or information regarding the current flight's estimated arrival time. If the display area is showing an electronic print publication, the auxiliary control segment may display the current page number and control icons for changing to the next page or a previous page. In some configurations, the auxiliary control segment may display announcements, such as menu items available, promotions, and/or advertising.

Figure 3C:
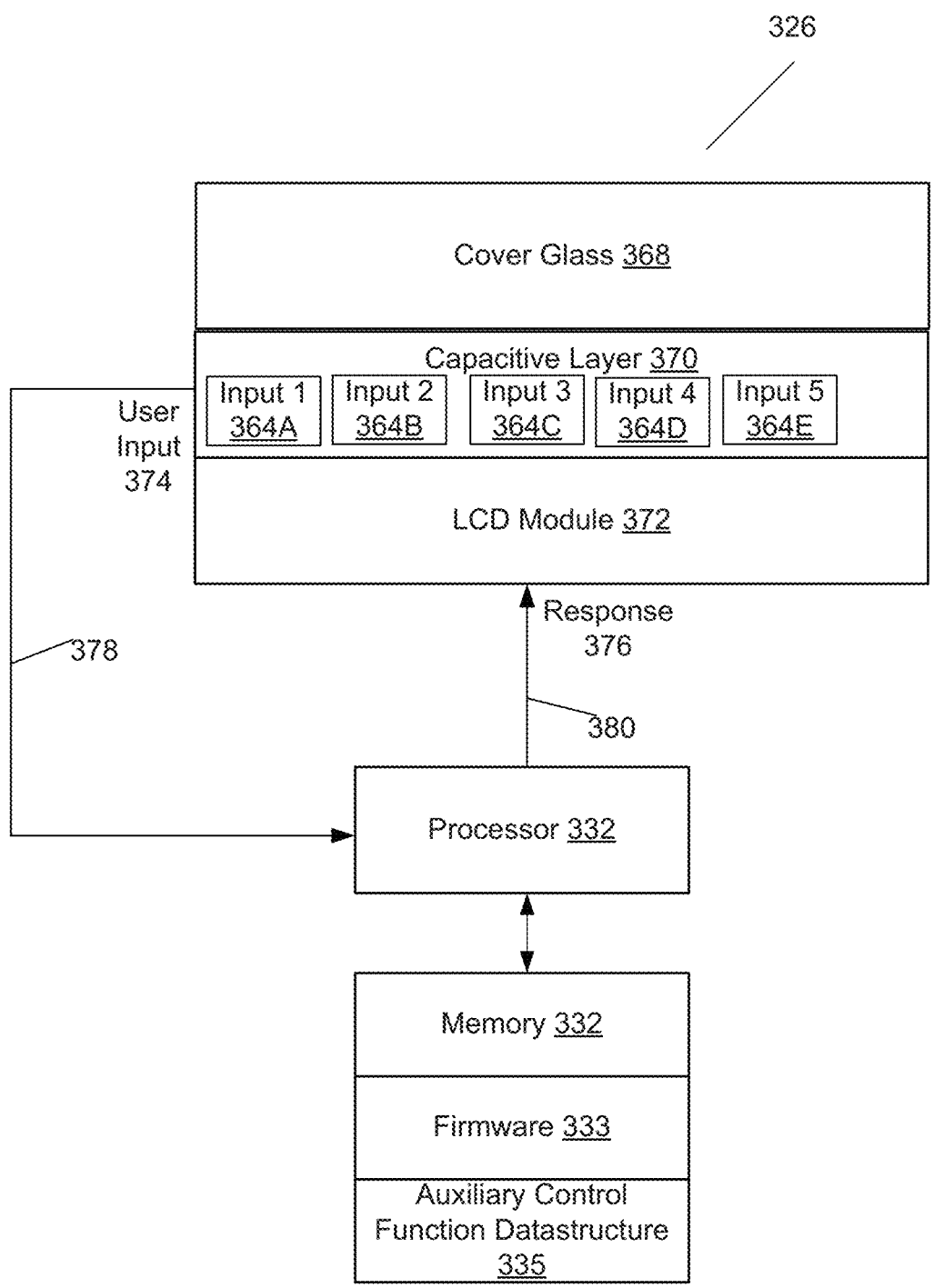
FIG. 3C shows an example of a layered structure for the display of FIG. 3B, according to one aspect of the present disclosure.

FIG. 3C shows an example of a layered structure for display 330 of the seat device 326, according to one aspect of the present disclosure. The layered structure includes a cover glass 368 that covers the entire display area 360, segment 362 and auxiliary display area 366.

The capacitive layer 370 is located under the cover glass 368. The capacitive layer 370 width is substantially equal to the display area 360 width and has a height that may vary based on the overall size of the display 330. In another aspect, when the capacitive layer 370 is placed vertically next to display area 360, the width of the capacitive layer 370 varies based on the size of display 360.

The capacitive layer 370 interfaces with the processor 332 via a first bus 378 (for example, I²C, Universal Serial bus or any other interconnect type) to receive a user input 374.

A LCD module 372 interfaces with the capacitive layer 370. The LCD module 372 communicates with the processor 332 via a second bus 380, for example, a MIPI (Mobile Industry Processor Interface) bus or any other bus type.

When user input 374 is received via one of the input icons of the capacitive layer 370, the user input is provided to the processor 332 via the first bus 378. The processor 332 executing firmware instructions 3333 out of memory 332 provides a response 376 to the LCD module 372 via the second bus 380. The response varies based on the user input. The various adaptive aspects of the present disclosure are not limited to any specific input/response type.

In one aspect, processor 332 maintains an auxiliary control function data structure 335 (referred to as data structure 335). The data structure 335 stores a listing of icons that are associated with certain media types, for example, movies, audio files, video games and others. The data structure 335 enables processor 332 to dynamically change the control functions within segment 362 based on the media type.

Figure 3D:
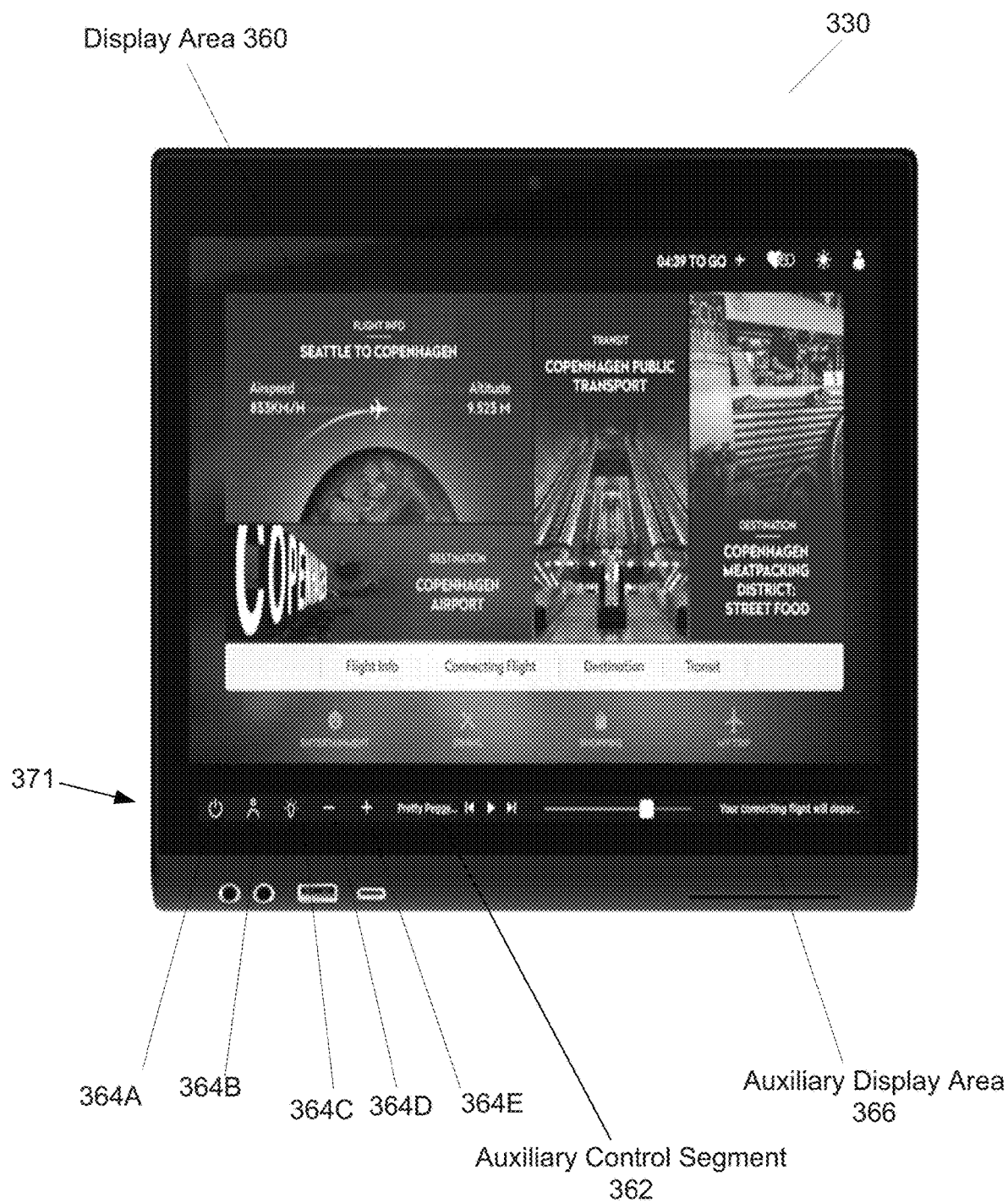
FIG. 3D shows an example of the display of FIG. 3B, according to one aspect of the present disclosure.

FIG. 3D shows an example of display 330 of seat device 326. The display area 360 shows media content that is presented to a user. The various input icons 364A-364E may be customized based on airline preference. Segment 362 also provides the name of the media file that may be playing at any given time. The auxiliary display area 366 shows a message that may be scrolled, stating "your connecting flight will depart . . . " followed by an indication of time without interrupting the content shown within display area 360.

Figure 4A:
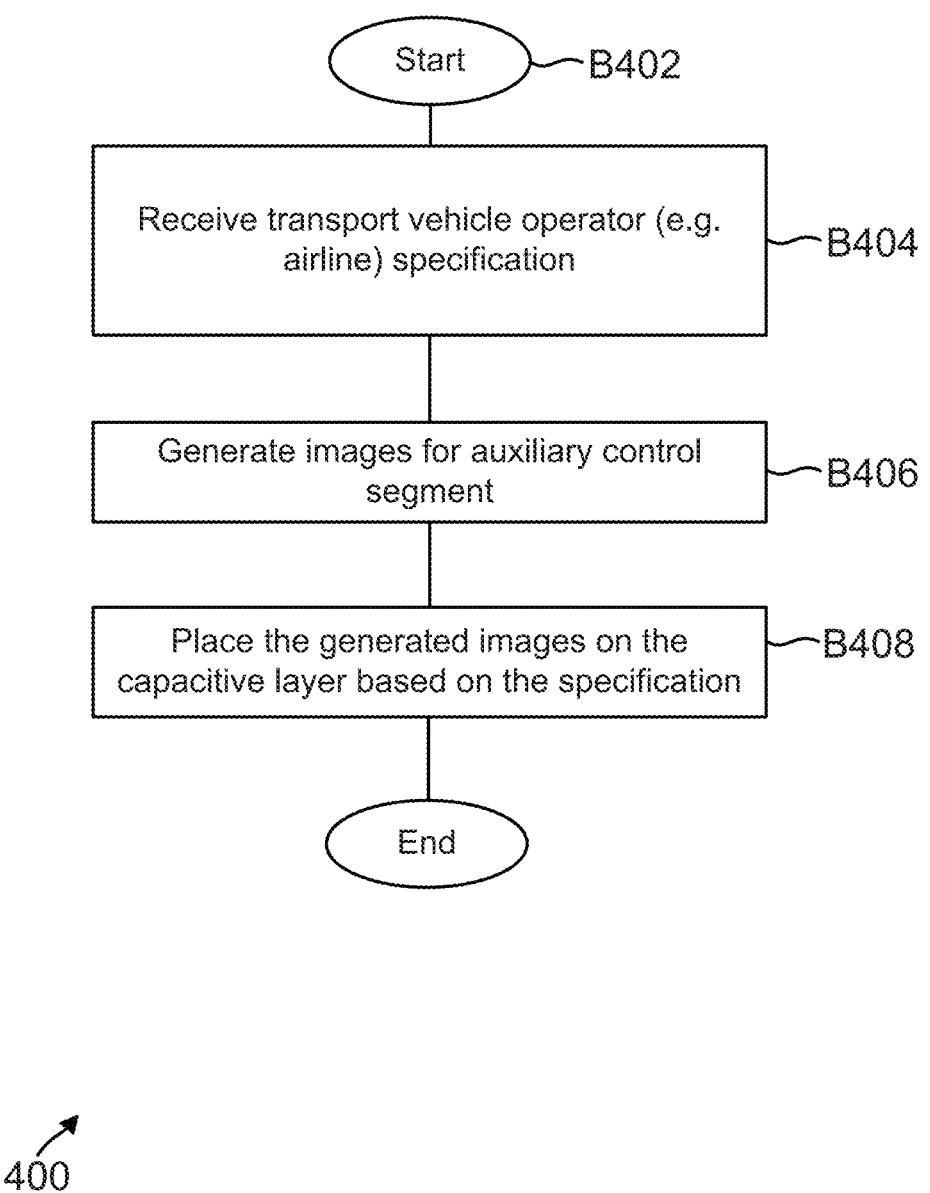
FIG. 4A shows a process flow for configuring a capacitive layer of a display device, according to one aspect of the present disclosure.

Process Flows:

FIG. 4A shows a process 400 for configuring the segment 362 of the capacitive layer 370, according to one aspect of the present disclosure. Although the description below is based on an aircraft, the innovative technology disclosed herein may be used on other vehicles, for example, trains, buses, ships, recreational vehicles and others.

The process begins in block B402. In block B404, airline specifications for segment 362 are received. In one aspect, the specifications are received electronically by a computing device. Based on the specification, icon images for segment 362 are generated. The images are generated by using image processing software executed by a computing device. In block B408, the generated images are superimposed on the capacitive layer 370 to be used as input buttons/icons (e.g. 364A-364E, FIG. 3D). Thereafter, segment 362 is ready for use to receive user input. In conventional systems, the various input icons/buttons are hard coded and difficult to change. Process 400 provides technology where input icons are customized across the capacitive layer 370 within segment 362.

Figure 4B:
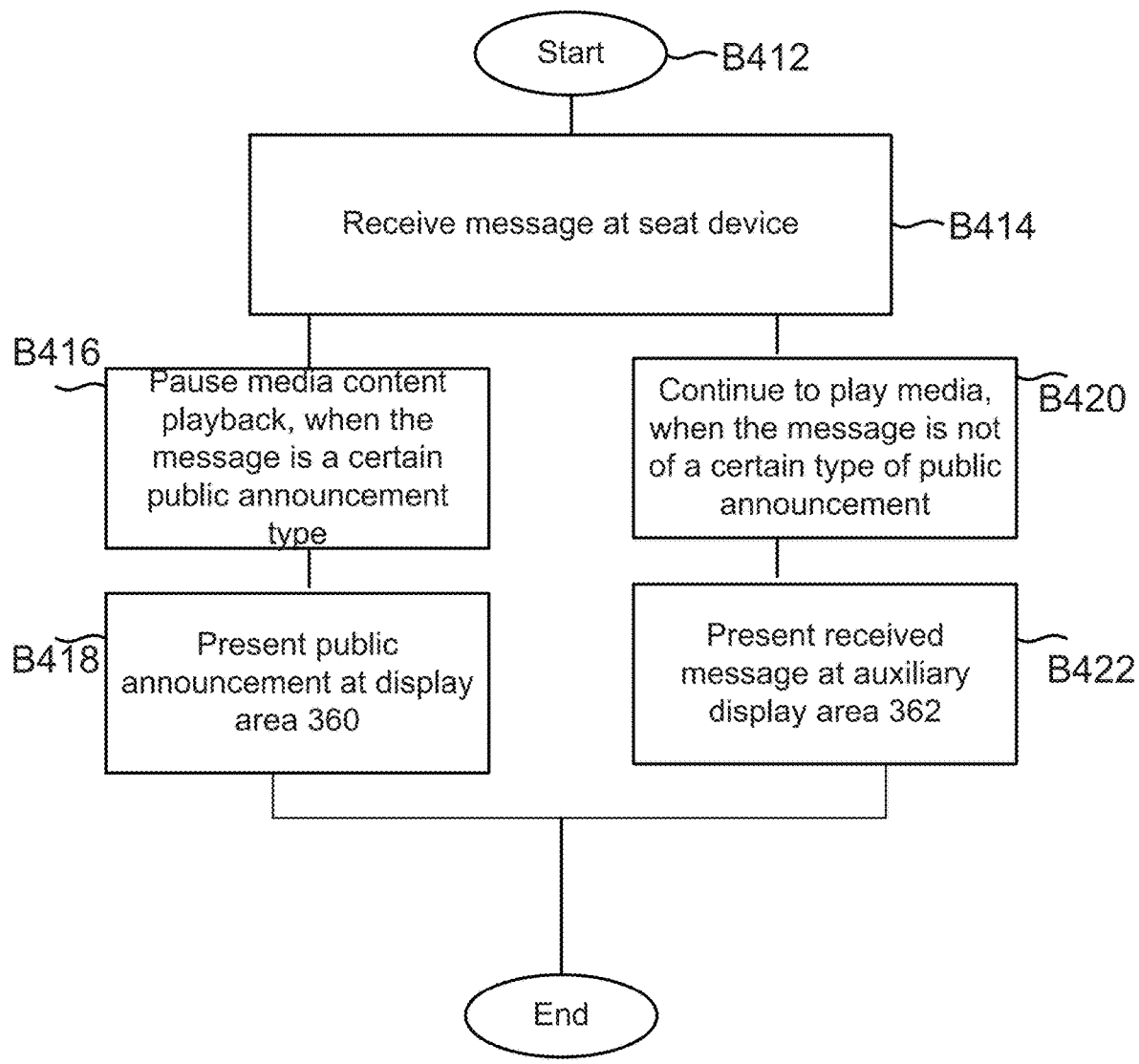
FIG. 4B shows a process flow for displaying messages at the auxiliary display area, according to one aspect of the present disclosure.

FIG. 4B shows a process 410 for using the auxiliary display area 366, according to one aspect of the present disclosure. Process 410 begins when segment 362 and auxiliary display area 366 have been configured. In block B414, a message is received at the seat device 326. The message may be from server 345 or any other device. In one aspect, if the message is a public announcement, then the message is tagged with an identifier identifying the message as a public announcement. The type of tag indicates to the seat device 326 that the message is to be played on display 360. In block B416, the media that may be playing when the message is received is paused and the public announcement is presented in block B368 within display area 360.

If the received message is not of a certain type of public announcement, then in block B420, the media content continues to play within display area 360 and the message is presented within the auxiliary display area 362 in block B422.

Depending on the message type, the media content that a user may be viewing is not interrupted. The auxiliary display area 366 is used to display certain message types to minimize interruption and improve overall user viewing experience.

In one aspect, the auxiliary control segment 362 enables a user to control seat device 326. The auxiliary display area 366 enables the user to read notifications and messages. The disclosed technology enables the passenger to control seat device 326 without interruption of media that may be playing within display area 360. The control icons on capacitive layer 370 can be customized without changing any physical hardware, which makes it easier to upgrade or make changes to the seat device configuration.

Figure 4C:
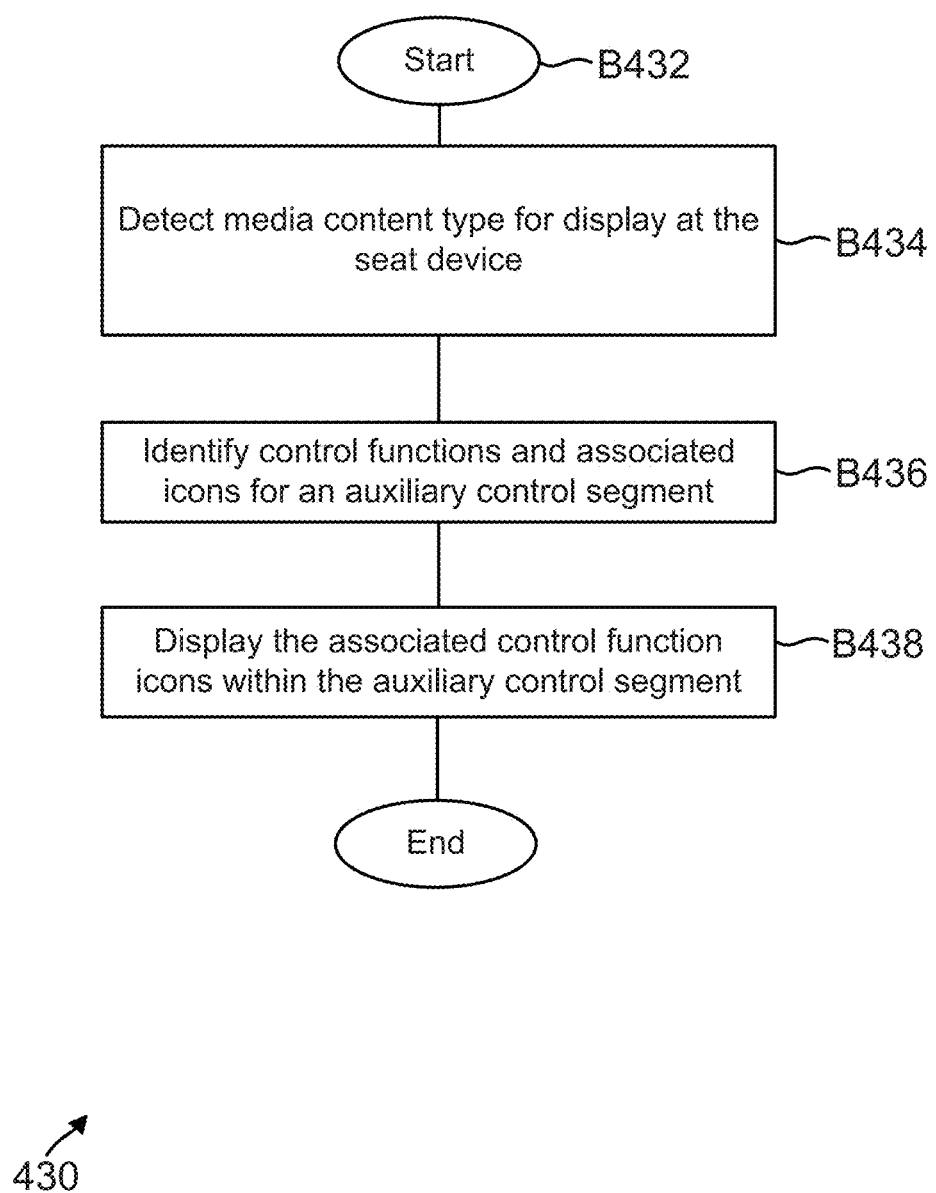
FIG. 4C shows a process flow for displaying auxiliary control functions, according to one aspect of the present disclosure.

FIG. 4C shows a process flow 430 for dynamically changing control functions within segment 362, according to one aspect of the present disclosure. Process 430 begins in block B432 when segment 362 has been configured and seat device 326 is initialized. In block B434, the processor 332 executing firmware instructions 333 detects a certain media type for display within display area 360. The media type may be a movie, a video game, an audio file or any other media type.

In block B436, in response to the detection, processor 332 uses data structure 335 to identify the control function cons for the media type. The associated control function icons are displayed with segment 362 in block B438.

In one aspect, the control icons within segment 362 change based on the media type that is being played within display area 360.

Figure 5:
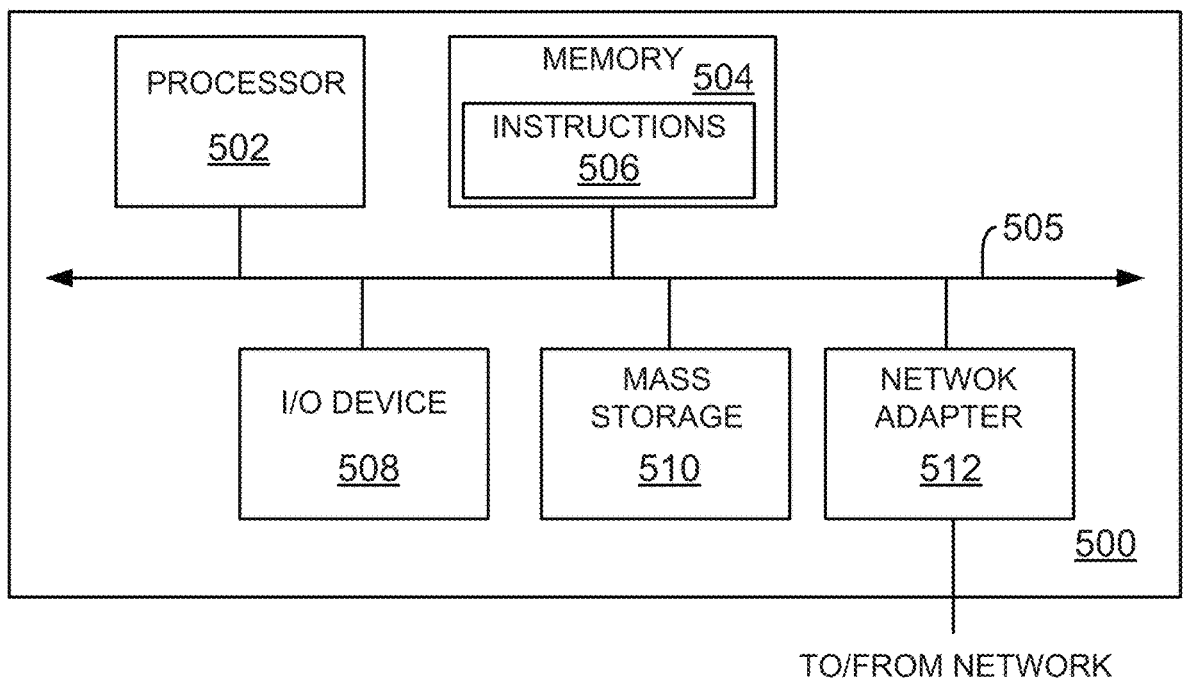
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent media server 112, computing system 106, WAP 130, onboard management system 344, seat device 326, any user device (PED 302) that attempts to interface with a vehicle computing device or a computing device that is used to configure the capacitive layer 370 with custom icons. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to store data structure 335 and implement the process steps of FIGS. 4A-4C described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for display devices at a transportation vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A system for an aircraft, the system comprising:
    an in-flight entertainment system with an information processing system including a seat device, the seat device including a processor and a memory with the processor executing instructions out of the memory and a display device for displaying content from a media file;
    the display device including:
        a display area to display the content of the media file; and
        a capacitive layer including an auxiliary segment, separate from the display area, the auxiliary segment including:
            an auxiliary control segment with configurable input icons to control the media file presentation in the display area, without displaying any control function icons within the display area, while the content is being played;
            wherein the configurable input icons are customizable for different airlines, dynamically selected by the processor from a data structure, based on a media type displayed in the display area, and change dynamically, based on the media type displayed in the display area; wherein the data structure stores a listing of icons associated with different media types including movies, audio files and video games, and the processor selects the configurable input icons from the listing based on the media type; and
            an auxiliary display segment, separate from the display area and the auxiliary control segment, to display messages without interrupting media file presentation in the display area; wherein messages displayed in the auxiliary display segment vary based on the media type displayed in the display area;
            wherein a size of both the auxiliary control segment and the auxiliary display segment is variable, controlled by the processor;
            wherein the capacitive layer and the display area are located on a common surface of the display device.

2. The system of claim 1, wherein the capacitive layer is located horizontally below the display area and the capacitive layer and the display area each have width substantially equal to one another, and the capacitive layer includes a height that varies based on size of the display area.

3. The system of claim 1, wherein the capacitive layer is placed vertically adjacent to the display area in which the capacitive layer and the display area each have a height substantially equal to one another, and the capacitive area including a width that varies based on size of the display area.

4. The system of claim 1, wherein the auxiliary display segment displays a public announcement message, while the content is being displayed in the display area.

5. The system of claim 1, wherein, when the display area displays video game content, for a video game played by a passenger, and the passenger is simultaneously listening to music, the auxiliary control segment provides icons to control the music and the auxiliary display segment displays information associated with the music.

6. The system of claim 5, wherein the capacitive layer interfaces with a liquid crystal display module, and a user input is received by the processor via a first bus and a response is provided by the processor to the liquid crystal display module via a second bus.

7. The system of claim 1, wherein when a passenger is viewing flight information in the display area, the auxiliary display segment displays information of a next flight for the passenger.

8. A seat device of a transportation vehicle, the seat device comprising:
a processor and a memory with the processor executing instructions out of the memory and a display device for displaying content of a media file;
the display device including:
a first segment to display content of the media file;
a second segment with a capacitive layer, the second segment including an auxiliary control segment with configurable input icons to control the media file presentation in the first segment, without displaying any control icons within the first segment while the content is being played in, wherein the configurable input icons dynamically change within the auxiliary control segment, based on media type or functional context;
wherein the configurable input icons are customizable for different airlines, dynamically selected by the processor from a data structure, based on a media type displayed in the first segment, the data structure stores a listing of icons associated with different media types including movies, audio files and video games, and the processor selects the configurable input icons from the listing based on the media type or the functional context; and
an auxiliary display segment, separate from the first segment and the auxiliary control segment, to display messages without interrupting the media file presentation; wherein messages displayed in the auxiliary display segment vary based on the media type displayed in the first segment;
wherein a size of both the auxiliary control segment and the auxiliary display segment is variable, controlled by the processor, with the capacitive layer extending over both a length of the auxiliary control segment and the auxiliary display segment;
wherein the capacitive layer and the first segment are located on a common surface of the display device.

9. The seat device of claim 8, wherein the second segment is located horizontally below the first segment such that a width of the second segment is the same as a width of the first segment and a height of the second segment varies based on a size of the first segment.

10. The seat device of claim 8, wherein the second segment is placed vertically adjacent to the first segment such that a height of the second segment is the same as the height of the first segment and a width of the second segment varies based on a size of the first segment.

11. The seat device of claim 8, wherein a cover glass covers both the first segment and the second segment, and advertising is shown at least some of the time in the auxiliary display segment.

12. The seat device of claim 8, wherein the auxiliary display segment displays a public announcement message, while the content is being displayed in the first segment.

13. The seat device of claim 12, wherein the second segment interfaces with a liquid crystal display module, and a user input is received by the processor via a first bus and a response is provided by the processor via a second bus.

14. The seat device of claim 8, wherein when the first segment displays video game content, for a video game played by a passenger, and the passenger is simultaneously listening to music, the auxiliary control segment provides icons to control the music and the auxiliary display segment displays information associated with the music.

15. The seat device of claim 8, wherein when a passenger is viewing flight information in the first segment, the auxiliary display segment displays information of a next flight for the passenger.

16. A method comprising:
mounting a seat device in a vehicle for use by a passenger at a seat in which the seat device includes a processor executing instructions out of a memory and a display device for displaying content from a media file in which the display device includes a display area where the content is displayed;
providing an auxiliary segment having an auxiliary control segment and an auxiliary display segment, the auxiliary control segment having configurable input icons to control the media file presentation in the display area while the content is being played;
wherein the input icons are customizable for different vehicle operators;
dynamically changing the input icons based on the content displayed in the display area; wherein the input icons are dynamically selected by the processor from a data structure, based on a media type displayed in the display area segment, the data structure stores a listing of icons associated with different media types including movies, audio files and video games, and the processor selects the input icons from the listing based on the media type; and
receiving and displaying messages on the auxiliary display segment, separate from the display area and the auxiliary control segment, without interrupting the media file presentation in the display area; wherein messages displayed in the auxiliary display segment vary based on the media type displayed in the display area;
wherein a size of both the auxiliary control segment and the auxiliary display segment is variable, controlled by the processor;
wherein the auxiliary segment and the display area are located on a common surface of the display device.

17. The method of claim 16, further comprising: providing a capacitive layer horizontally below the display area, the capacitive layer and the auxiliary segment being coextensive with one another, in which the capacitive layer and display area each include a substantially equal width and varying height of the capacitive layer based on size of the display area.

18. The method of claim 16, further comprising: providing a capacitive layer vertically adjacent to the display area with the capacitive layer and the auxiliary segment being coextensive with one another with the capacitive layer and the display area each including a substantially equal height and varying width of the capacitive layer based on size of the display area.

19. The method of claim 16, further comprising:
providing a capacitive layer and liquid crystal display module;
interfacing the capacitive layer with the liquid crystal display module;
receiving user input on the capacitive layer by the processor via a first bus; and
providing a response by the processor to the liquid crystal display module via a second bus.

20. The method of claim 16, further comprising: interrupting media file presentation for certain public announcements by showing a message in the display area.

* * * * *